United States Patent [19]

Rougemont

[11] 4,421,452
[45] Dec. 20, 1983

[54] STATION FOR COLLECTING WIND ENERGY

[76] Inventor: Raoul Rougemont, Basse Bergerie, Francueil, F-37150 Blere, France

[21] Appl. No.: 268,992
[22] PCT Filed: Sep. 26, 1980
[86] PCT No.: PCT/FR80/00141
 § 371 Date: May 28, 1981
 § 102(e) Date: May 28, 1981
[87] PCT Pub. No.: WO81/00887
 PCT Pub. Date: Apr. 2, 1981

[30] Foreign Application Priority Data

Sep. 28, 1979 [FR] France .................. 79 24285
Jun. 4, 1980 [FR] France .................. 80 12382

[51] Int. Cl.³ .............................. F03D 7/04
[52] U.S. Cl. ............................ 415/4; 415/68; 415/122 A; 415/DIG. 8
[58] Field of Search .......... 415/19, 122 A, 2 A, 415/3 A, 4 A, 68

[56] References Cited

U.S. PATENT DOCUMENTS 2,485,543 10/1949 Andreau ............... 415/2 A
4,070,131 1/1978 Yen ..................... 415/3 A
4,116,581 9/1978 Bolie ................... 415/2 A

FOREIGN PATENT DOCUMENTS 25406 12/1883 Fed. Rep. of Germany .
2920243 11/1979 Fed. Rep. of Germany .
529301 11/1921 France .
1087436 2/1955 France .
54-108145 9/1979 Japan ............... 415/DIG. 8
6516544 6/1967 Netherlands .
185939 9/1922 United Kingdom ...... 415/DIG. 8
192405 9/1923 United Kingdom .
1519774 8/1978 United Kingdom ........ 415/2 A
1519878 8/1978 United Kingdom .

Primary Examiner—Philip R. Coe
Assistant Examiner—Frankie L. Stinson
Attorney, Agent, or Firm—Cushman, Darby & Cushman

[57] ABSTRACT

Station for collecting wind energy comprised of a hollow column (1) including from top to bottom: a collecting housing (9) provided with inlet flaps (10), a transfer housing (12) including the driving elements (6) which drive through shafts (7) and (20) the operating members (8), an evacuation housing (16) provided with outer flaps (11). The arrows indicate the direction of circulation of airflow inside the station. The inner flaps (10) exposed to the wind open under the action of the latter which maintains the other flaps closed. The outer flaps (11) positioned out of the wind open under the action of the residual pressure remaining after acting on the driving members (6), whereas the other flaps are kept closed under the wind pressure. Safety valves (3) are provided for preventing any prejudicial overpressure. The station includes starting means for the driving elements under light wind and means for regulating the airflow.

12 Claims, 21 Drawing Figures

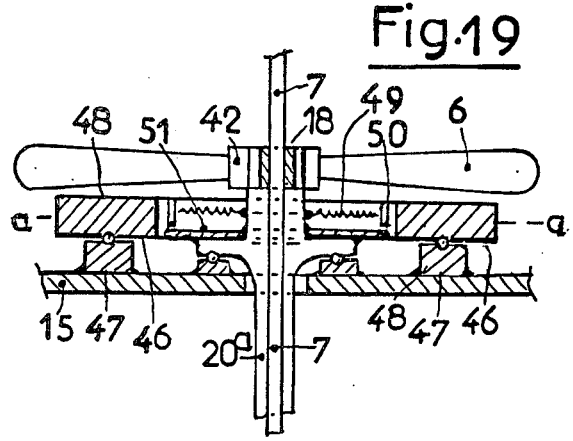
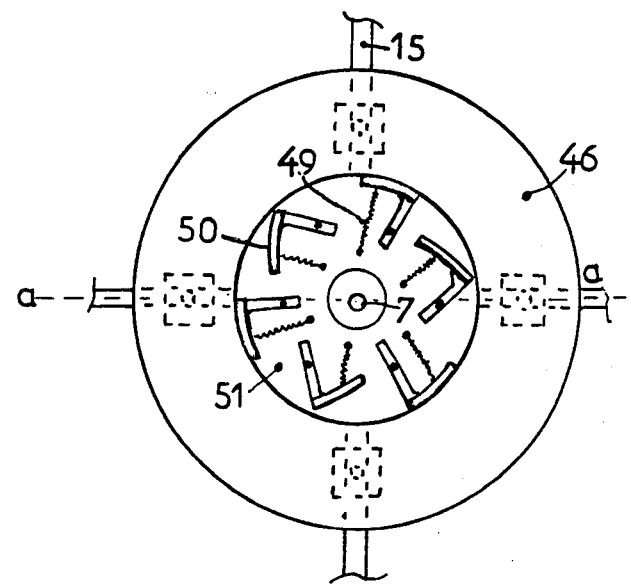
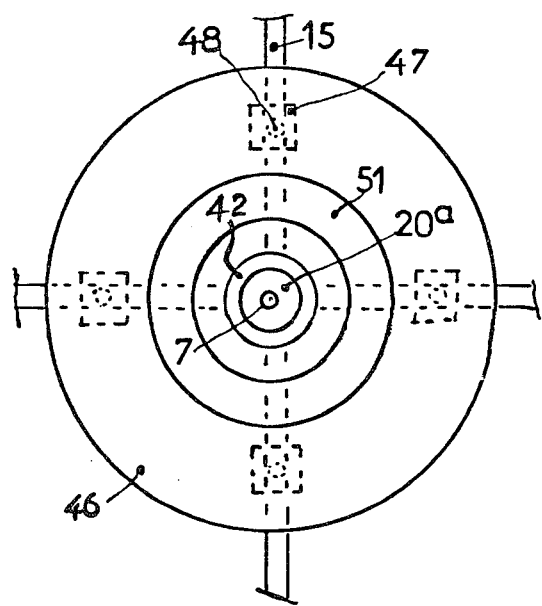

STATION FOR COLLECTING WIND ENERGY

Apparatus for the purpose of collecting wind energy already exist in the prior art technique. Those apparatus are appreciably derived from ancient windmills and comprise helixes having two, three or several vanes, whether or not carinated, with or without variable steps, bucket wheels, etc . . . The driving motors forming those helixes must obviously be located as high as possible to be actuated at the maximum by the force of the wind, and this implies to have them occupy a position in which they are exposed to sudden squalls, storms, etc. Moreover, they must be movable in orientation according to the direction of the wind. Their precarious equilibrium is frequently transformed out of balance when the wind is blowing in sudden gusts from top to bottom or inversely, causing particularly harmful violent shocks, hence the necessity of constructing a very strong framework and assembly and to resort to very elaborate apparatus. Notwithstanding this those devices resist poorly and their height is very limited as well as their capacity for being transmitted, and this greatly decreases their advantage, particularly as far as great stations for the purpose of serving communities are concerned.

The object of the present invention is a station for collecting winds obviating all the above-enumerated disadvantages and consequently for making very powerful installations, the assembly of which is considerably streamlined and renders their functioning much more reliable.

According to the invention, the station is formed by a construction in the form of a hollow column, at the interior of which the driving elements are located, which thus are entirely protected, the wind being collected at the upper part of the column with the help of appropriate particular means. The arrangements of this construction assures by a simple set of articulated flaps the optimum action of the wind on the energy collecting members, such as helixes and vanes, whatever be the direction of the latter, without the necessity for a change in orientation of those members, even in the case of variations of direction or sudden squalls.

The driving members are movable in rotation around a vertical axis, arrangement permitting to provide supporting means placed at the end far from the center of those members which, by giving great stability to the latter, allows for giving them very large dimensions and because of this to obtain great effectiveness.

Moreover, safety valves protect the driving members against any eventual excess pressure that could be harmful.

Finally, according to the invention, means are also provided to cause the driving members to start in rotation in the case where the airflow is insufficient to determine actuation as well as to determine regulation of the movement of rotation of the said driving members.

The attached drawing is for the purpose of illustration to give a detailed description of the invention showing in a schematic form various modes of embodiments thereof.

FIGS. 4, 5 and 6 show different forms of flaps that the column can be provided with.

Figure 16:
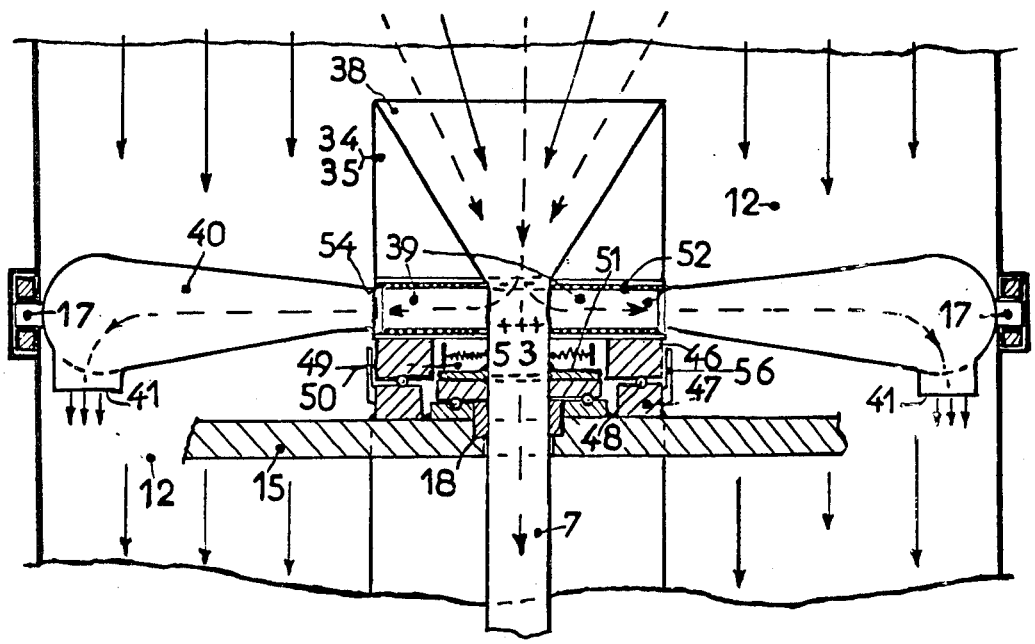
Figure 17:
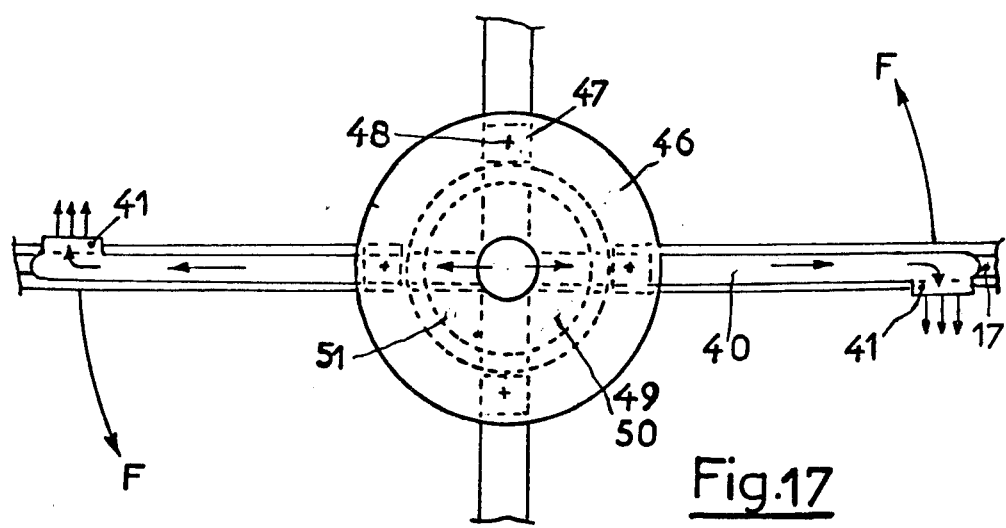

FIGS. 16 and 17 respectively show, in elevation and in plan view, an apparatus to allow for starting the driving members in rotation when the wind is insufficient to determine actuation, to which a regulating flap is associated.

Figure 18:
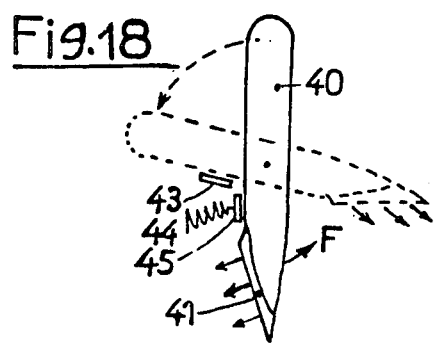

FIG. 18 shows the two positions that an helix can occupy: rest or "flag" (full lines) and work (interrupted lines).

Figure 7:
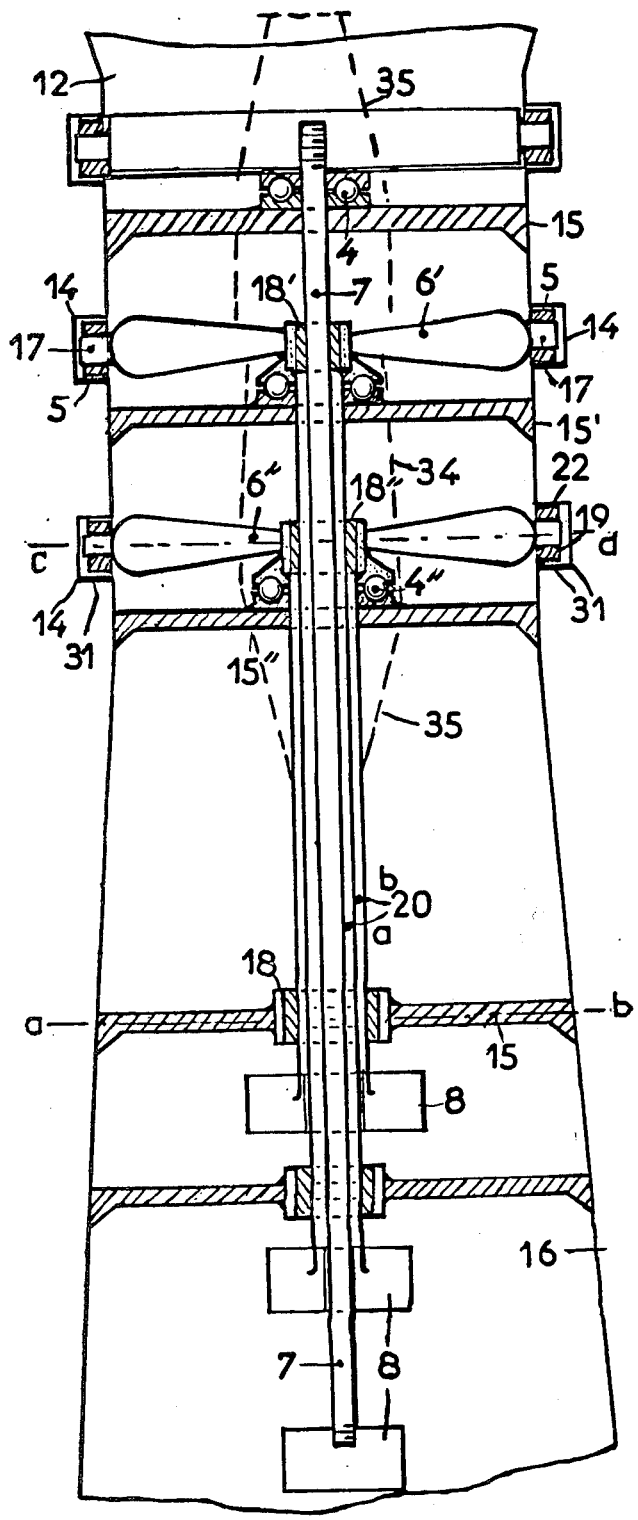
FIG. 7 shows in a more detailed manner the mounting of the driving members.

FIG. 19 shows an apparatus comprising the regulating flap visible on FIG. 16 applied to a driving element such as 6, FIG. 7.

FIGS. 20 and 21 are plan views at different levels of the regulating elements shown on FIG. 19.

Figure 1:
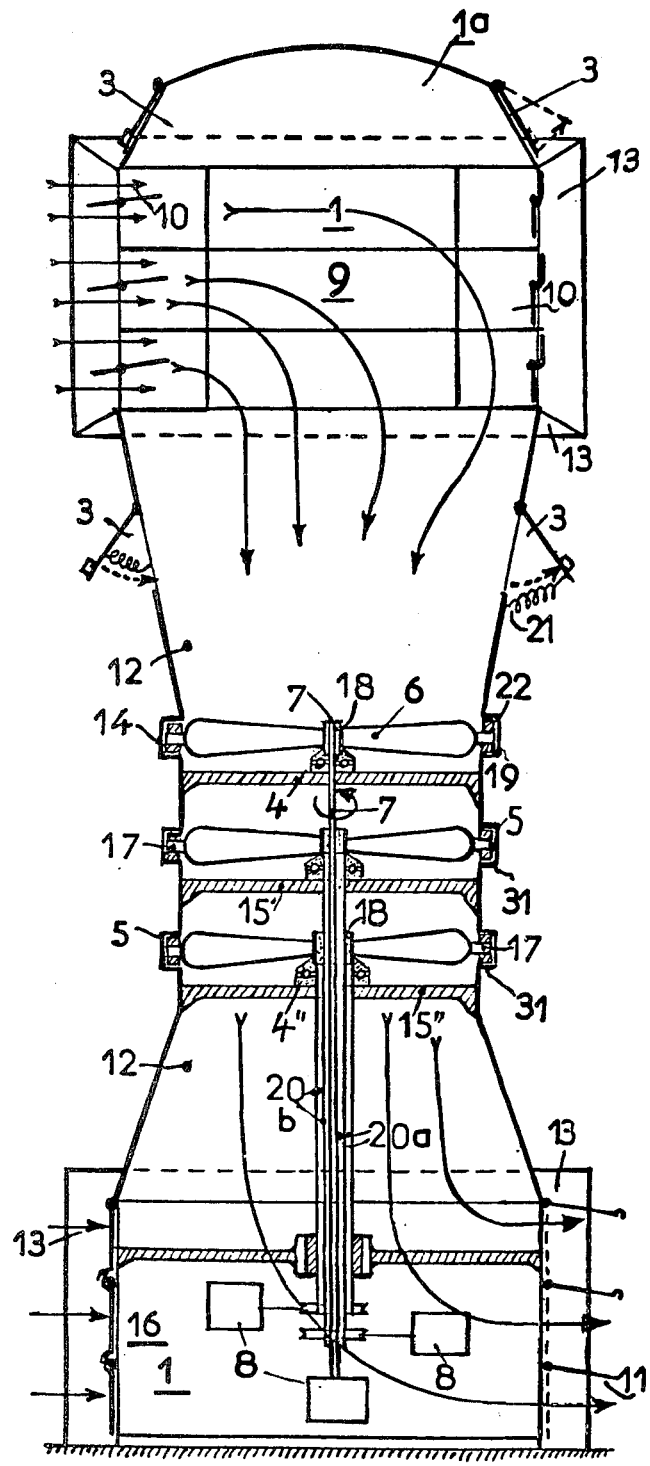
FIG. 1 shows an elevation and partial plan view of the aggregate of a station in the form of a column according to the invention together with the constituting element included in the latter.
Figure 2:
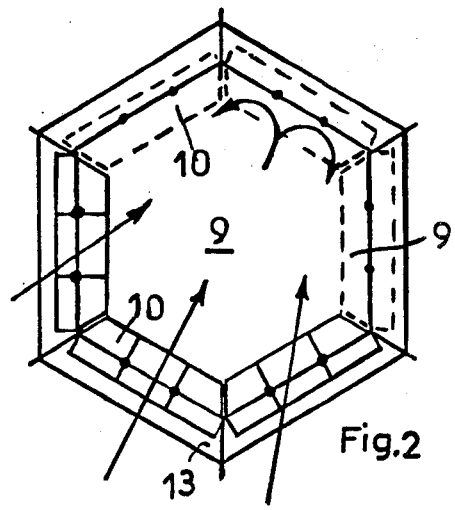
FIGS. 2 and 3 are plan views respectively of the upper part and lower part of the station.

On a general view illustrated by FIG. 1, the arrows indicate the direction of circulation of airflow inside the station formed by column 1. In this example, the upper and lower parts of the column have a hexagonal form. It is quite obvious that they could just as well be cylindrical and that the number of sides of the polygon could be different from six or any other.

This FIG. 1 will be described by enumerating the various constituent parts of the top toward the base of the column shown.

Reference 9 designates the space for wind collection, provided on its complete perimeter with inlet flaps 10 articulated (jointed) in a manner as to open towards the interior, the utility of such condition being defined later.

Underneath the collecting enclosure a place or transfer casing 12 is located on the periphery of which, at the upper part, security flaps 3 are located, the function of which will also be defined later.

This space 12 includes the driving elements. In this example, those elements are formed by a plurality of superposed helixes 6. Those helixes rest respectively on ball-bearings 4 which carry on crossbars 15 fixed on chamber 12. Crossbars 15 are profiled in a manner as to oppose a very low resistance to the flow movement.

In this example, three helixes respectively operate concentric transmission shafts. The upper helix is integral with the central shaft 7, while the helixes of the lower stages are each respectively integral with a tubular shaft 20a and 20b.

The above-mentioned shafts 7, 20a and 20b each respectively operate utilization means 8. The latter are schematically represented because they do not come within the frame of the invention.

Transfer housing 12 is in communication with evacuation housing 16, the exterior contour of which is provided with flaps 11 articulated in a manner as to open towards the exterior.

Reference will be made to FIGS. 1 and 7 for the description of various supporting means of the helixes. In this example, the upper helix 6 (not shown on FIG. 7)

is fixed on central shaft 7. It is integral with the upper part of central ball-bearings 4, the lower part of which is integral with cross-bars 15. Central helix 6' is integral with bearing casing 18', the core of which is integral with central shaft 7. This housing is integral with the upper part of ball-bearings 4', which is integral with tubular shaft 20a.

Lower helix 6" is integral with the housing of rolling mechanism 18", the core of which is integral with interior tubular shaft 20a operated by central helix 6'. The housing of this rolling mechanism 18" is integral with the upper part of ball-bearings 4", which is rendered integral with exterior tubular shaft 20b.

As shown on the figure, the lower part of ball-bearings 4, 4' and 4" is respectively integral wich each of the corresponding fixed cross-bars 15, 15' and 15".

From the arrangement just mentioned the result is that the respective rotation systems of the helixes, and consequently of the corresponding utilization means 8, are strictly independent, which in practice can have many advantages.

Let us be reminded that the parts designated by references 8 are absolutely schematic and can as well be operating members utilization means as transmission means of a reducing as well as multiplying movement said operating means can be placed in all appropriate points.

A particular arrangement relative to the supporting means of the extremities of the helixes will now be described. For each of the latter and at their level an impervious (water and air tight) circular track is provided with a rolling road such as metallic 31. Axes 17 respectively integral with each of the vanes, arranged in the extension of the latter, carry on bearing 19 of a carriage 5 provided with rolling means such as ball-bearings, being carried on rolling road 31.

Figure 8:
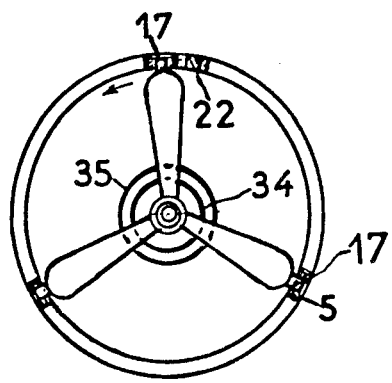
FIGS. 8 and 9 are plan views at the levels of FIG. 7 defined by mixed lines (dashes).
Figure 9:
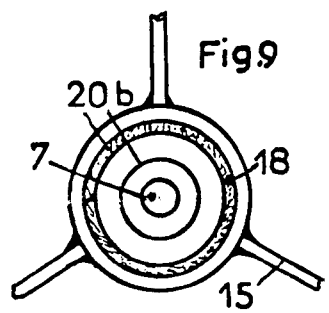

According to an interesting characteristic of the invention, the supporting means placed at the extremity of the vanes which have just been described can comprise propulsion means such as electric motors having the function of assuring starting of rotation of the helixes in the case where action of the airflow is insufficient to cause starting. Reference 22, FIG. 8, designates their location in a general form.

Figure 10:
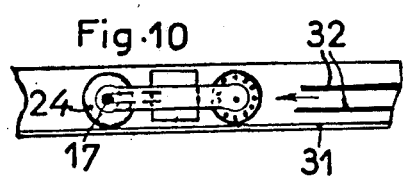
FIGS. 10 to 12 show means for starting rotation of the driving members independently from the action of the wind.
Figure 11:
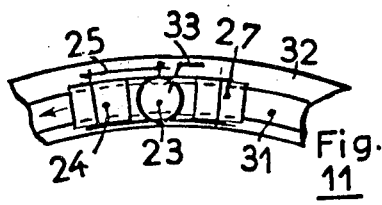

FIGS. 10 and 11 show a motor carriage comprising a tractor roller 24 circulating in the path in the form of hollow 14 and carrying axis 17 in its center. Motor 23 carries along the carriage by the medium of a chain relay or trapezoidal belt. Ball-bearings 27 assures stability of the assembly. Feeding while running is assured by rolling metallic path 31 and a second rolling metallic path 32 of bottom of groove 14 connected to the supply source on which polishers 33 assure contact.

The linear motor can be used by placing the circuit in the place of motor 23, the latter being displaced on the inductor 31 which is substituted to rolling path 31 and receives the first contact, the second being established by trolley 32 placed at the bottom of gorge and polishers 33; the bearings 25 and 27 then being all ball-bearings, riding inductor 31.

Starting propellers 22 having a useful function only in the case of a weak wind, a simple system to help starting can be used for freeing the driving elements 6 at their extremity 17, from the dead weight of the propelling carriages when they are not in use, the latter being placed in a withdrawing position from the ball-bearings 5 of the end of the vane and provided with ratchets (pawls) of the free wheel type acting in the direction of propulsion and carrying along the vanes by the extremity of axes 17 provided longer for this effect.

Figure 12:
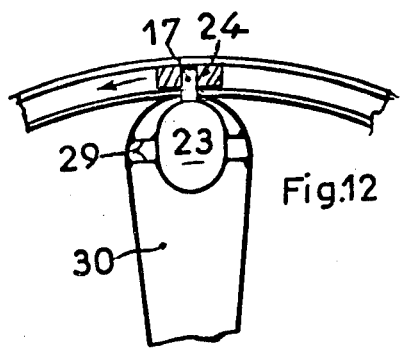

FIG. 12 shows a variation of embodiment of the propulsion means. According to this arrangement a motor 23 bearing axis 17 is placed at the interior of the vane 30 of the helix on cross-bars 29. This motor carries along bearing 24 which, in its turn, carries along in its movement of rotation the vane of the helix 30.

Current supplying of the motor(s) and propulsion means can be controlled automatically by any appropriate means known such as a contact anemometer (wind gage), while interruption can be obtained automatically when the wind carries along the driving elements 6 at the anticipated speed, for example, by means of a counter mechanism for counting the turns, registering the speed of rotation of the driving element.

The operation of such a station will now be described.

It has been mentioned that the flaps 10, the collecting enclosure station 9 is provided with, open towards the interior. In those conditions, those of the flaps exposed to the wind are subjected to the effect of the latter and open, leaving passage to the airflow according to the direction of the arrows in FIG. 1. In fact, contrary to the flaps exposed to the wind, all the others are applied on their location by pressure produced in enclosure 9. It is obviously understood that the aforementioned flow drives the driving elements formed in this example by the helixes in the number of three. This number can, according to the cases, be increased or diminished.

After this motor action, the airflow, the pressure of which is considerably reduced, is directed toward evacuation housing 16, the flaps 11 of which are located under the wind allowing for evacuation, while the flaps exposed to the wind (left on the figure) are firmly maintained by the pressure.

Figures 4, 5, 6:
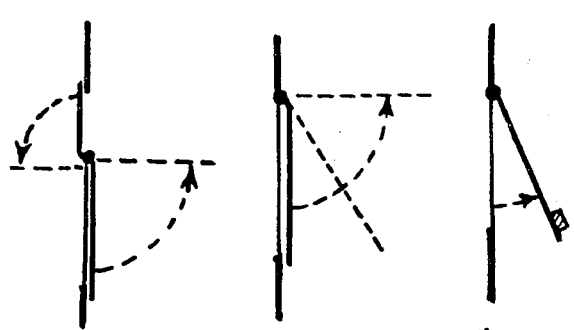

As indicated, flaps 3 forming safety valves are arranged at the periphery of the transfer station 12 as well as at the top 1a of column 1 in this example. Those valves are damaged in a known manner at the desired pressure, as well by spring 21 (FIG. 1) as by mass weight (FIG. 6). Thus, any eventual excess pressure that could be harmful to the driving elements between each other, is rendered impossible.

The flap shown on FIG. 4 is articulated around a horizontal axis arranged in a manner as to divide the total surface of each of the said flaps into two parts, the surface of the part located above the said axis being lower than that of the part located underneath (such as the flaps 10, FIG. 1).

Figure 3:
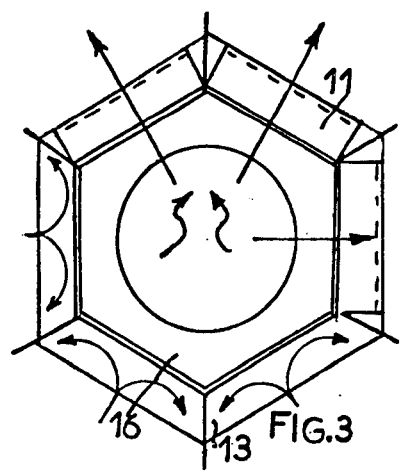

An articulated flap is shown on FIG. 5 around an horizontal axis located at the upper part (such as 11, FIGS. 1 and 3).

FIG. 6 shown an articulated flap in the same conditions, but provided with a mass in order to form safety valve.

It is obvious that articulated flaps could equally be utilized around a vertical axis on top and at the bottom of the flap, with abutment limiting the stroke of flapping before the perpendicular position to the airflow.

The flaps used, whatever their type, can in whole or in part be made of any appropriate materials such as metallic, sheet metal with axis and reinforcements, opaque or transparent reinforced plastic materials, plastic material on framings, fittings, or lattice work.

In addition, those flaps can be provided with springs and shock absorbers with free run at the beginning of opening and of closing, in a manner as to prevent an abrupt folding back of the flaps under the effect of wind squalls.

The station is favorably completed by vertical small wings and weatherboards arranged on the periphery of the column at the level of the collecting station 9 and of the evacuation station 16, those flanges being located at the edges when those housing are of a polygonal form.

This assembly designated by reference 13 forms an efficient wind-guide. The flanges are distributed on the periphery of the column at predetermined angular intervals when the stations are of a cylindrical form.

Moreover, a deflecting means, designated by references 34 and 35 (FIG. 7) can be placed at the center of the column, covering the central elements. This deflecting means thus determines an excess pressure of airflow, directing it towards the exterior parts of the driving members, the most efficient parts, and there results a very important improvement in the yield.

Figure 13:
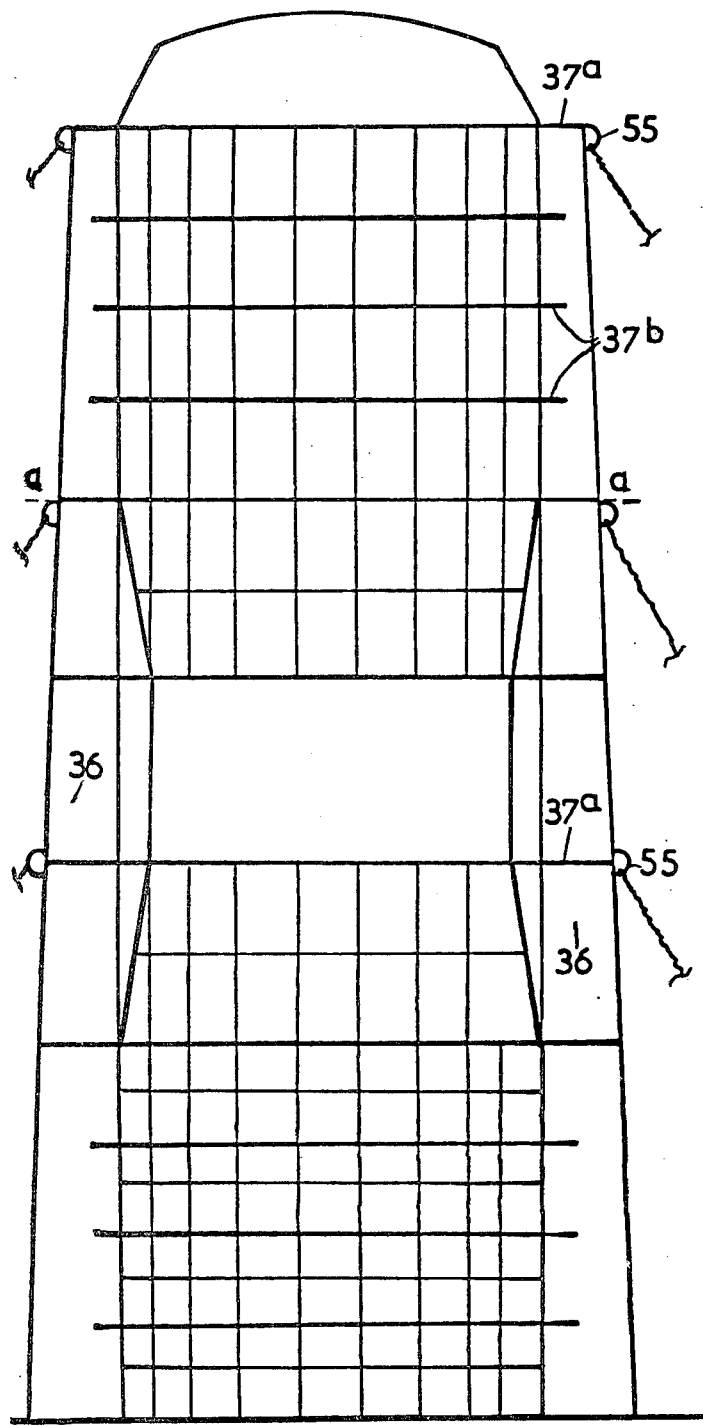
FIG. 13 shows an embodiment of the station in the form of a hollow column having a metallic structure.
Figure 14:
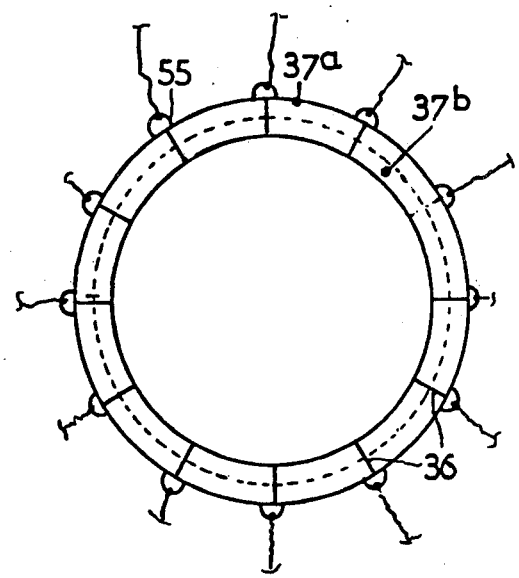
FIG. 14 is a schematic plan view according to a—a of FIG. 13.
Figure 15:
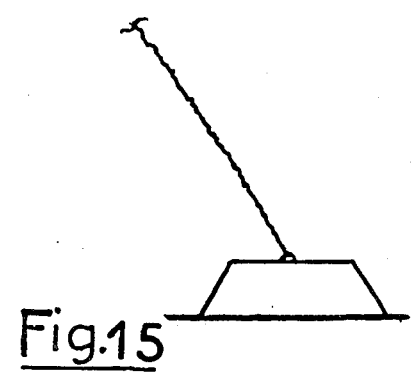
FIG. 15 shows schematically bracing means of the station.

The structure of a station such as has just been described can be entirely or partially metallic, made of concrete [reinforced] or other, or of conventional masonry. In this order of idea, a column of a metallic structure will be described now by means of FIGS. 13 and 14. On those figures, the structure is formed by elements in the form of flanges 36 integral with main belts forming awnings, two of which are designated by reference 37*a*, and of secondary belts also forming awnings, two of which are designated by reference 37*b*. Those latter bands can advantageously form supports for articulations of the flaps.

Reference 55 designates exterior fastening means provided for purposes of fastening wind braces.

Another apparatus which will permit obtaining the starting rotation for the driving members when sole direct action of the wind on the latter is insufficient will now be described by referring to FIGS. 16 and 17.

According to the embodiment shown on those figures, in the transfer housing 12 is included a hollow inverse truncated cone 38 in conduit connection with tubes 39 at the extremity of which the helix vanes 40 forming driving members, hollow here are disposed.

In this example, cone 38 is located at the interior of deflecting means 34–35 schematized on FIG. 7. This assembly together with the rotation regulating means which will be described later rest on a cross-bar 15 according with what was indicated in the description relative to FIGS. 1 and 7.

According to this embodiment the transmission shaft 7 integral with tubes 39 and the helix vanes 40 is also hollow. In accordance with what has been described in the foregoing, the helix vanes 40 are provided, let us be reminded, with axes 17 the role of which has already been defined. The extremities of the helix vanes 40 are provided with a blast nozzle 41. Each of the vanes can pivot axially around the supporting bearings 52, that can be locked at 54, the walls of the tubes 39 forming also complementary supporting bearings of the helix vanes, directly or by the means of interposed rolling mechanisms.

Thus, the airflow penetrating in the truck of cone 38 passes then in tubes 39 and vanes 40 to be exhausted by nozzles 41. Because of the form given to the nozzles, this airflow action causes pivoting following their axis of helix vanes 40 which thus take the position shown on FIGS. 17 and 18. By a reaction effect the result is the starting in rotation of the vanes in the direction indicated by arrows F.

According to another embodiment not shown, the airflow coming from cone 38 can be transmitted to the nozzles by means of exterior tubes integral with each helix vane and aerodynamically bound to the latter.

FIG. 18 which is a detail view, shows an helix vane 40 in at rest or "flag" position (full lines) and in working position (interrupted) lines. On this figure, references 43, 44 and 45 respectively designate the stop abutment of the helix vane in working position, the recall spring determining the return of the helix vane in the rest (or flag) position and the corresponding abutment to this latter position.

In the examples represented on FIGS. 16, 18, 19 to 21, the driving members are provided with a regulating guiding wheel of the rotation movement rendered integral of the latter by means of a centrifugal coupling. The regulating guide wheel, of an annular form, is designated by reference 46. This guide wheel stands on supports formed by bushings 47 by means of ball bearings 48. Safety guides 56 can be added to guide wheel 46.

Plungers (deadheads, runners, weights) 50 respectively brought back by springs 49 are disposed on a support 51 integral to the transmission shaft 7 interiorly of the annular mass 46.

In the example represented on FIGS. 20 and 21, the plungers are in the number of six and placed to act in two times by group of three. It is thus understood that when rotation of transmission shaft 7 is started, the centrifugal action is first exerted on a group of plungers such as shown, FIG. 20, and then on the other group of plungers, thus determining a coupling in two intervals particularly favorable to alleviate gusts of wind.

In the example shown on FIG. 16, it is indicated that transmission shaft 7 is hollow in order that the airflow can eventually act on other driving elements, the latter being placed in superposition. In the case of using only one driving member, the tubular shaft 7 could be closed as indicated at 53.

FIG. 19 represents an arrangement comprising a regulating flap but provided with a starting device according to FIGS. 16 and 17.

A magnetic coupling controlled by means either of an anemometer, or of a turn counting, in order to determine the functioning either by the action of the wind, or by the action of the system of rotation.

It is understood that the invention is not limited to the embodiments described and that any variations can be brought concerning, amongst others, the form and the number of the constituting elements without departing from the scope of the invention.

I claim:

1. A fixed station for wind energy conversion, regardless of wind direction, comprising:
   wall means providing an upright tubular column that is fixed in regard to translation, rotation and tilt, said column having means providing an upper inlet, a lower outlet and a transmission conduit extending between the inlet and the outlet;
   a plurality of inlet valve means angularly distributed about the periphery of the column inlet, each such inlet valve being constructed and arranged to admit wind impacting the column exterior to enter the column, but prevent wind which has entered the column from exiting the column, so that the wind which enters the column is directed to the transmission conduit;

a wind energy conversion system comprising: a plurality of shafts coaxially journalled for independent rotation in said column; each shaft having a wind energy conversion device mounted thereon which, when impacted by the wind is caused to turn, thus rotating the corresponding shaft; and rotary-power take-off means operatively connected to said shafts;

said wind energy conversion devices being located in said transmission conduit;

a plurality of outlet valve means angularly distributed about the periphery of the column outlet, each such outlet valve being constructed and arranged to exhaust wind impacting it from the column interior, and to prevent wind impacting the column exterior from entering the column;

a plurality of normally-biased-closed safety-valve means provided in the column wall means, for dumping excess wind pressure from the transmission conduit to prevent the impact of excessive wind pressure on the wind energy conversion devices;

auxiliary power means operatively connected with at least one of the wind energy conversion devices for overcoming inertia and thus initiating rotation of the respective wind energy conversion devices should the impacting wind be insufficiently strong to do so;

flywheel means journalled for rotation on the column; and clutch means for selectively engaging the flywheel means with the wind energy conversion system for storing the effect of wind power above a predetermined threshold power, and for utilizing the stored excess power to rotate said shafts when said shafts would otherwise rotate more slowly.

2. The fixed station for wind energy conversion of claim 1, wherein:

at least one of said shafts is tubular, each respective wind energy conversation device mounted thereon is hollow, has outlet nozzle means and radially inwardly is communicated to the interior of the respective shaft, and the respective shaft is provided with an inlet funnel, whereby at least some of the wind blowing into the inlet of the column blows into the respective tubular shaft, through the respective wind energy conversion device and out of the respective nozzles, producing a reaction which causes the respective wind energy conversion device to rotate.

3. The fixed station for wind energy conversion of claim 1, wherein:

said column wall means includes a metal tubular member with a series of external, circumferential, radially-projecting horizontal flanges, and a plurality of external, angularly-distributed, vertically-axially extending flanges;

at least some of said horizontal flanges opening radially inwardly toward the transmission conduit to provide respective circumferential groove means supporting respective ones of said energy conversion devices for rotation.

4. The fixed station for wind energy conversion of claim 1, further including:

means centrally providing said station with a plurality of angularly-distributed, radially projecting, vertically-axially extending vane means constructed and arranged relative to said wind energy conversion system to provide a wind brace therefor and for guiding wind along said transmission conduit.

5. The fixed station for wind energy conversion of claim 1, further including:

said column wall means comprising means defining a plurality of radially inwardly opening circumferential groove means having bearing surface means therein; and said energy conversion devices having bearing roller means riding on respective of said bearing surface means in respective of said circumferential groove means.

6. The fixed station for wind energy conversion of claim 5, wherein:

the auxiliary power means comprises electric motor means associated with said circumferential groove means and drivably operatively connected with said energy conversion devices adjacent said circumferential groove means for powering said energy conversion devices angularly about said groove means when wind energy is insufficient to overcome inertia of said wind energy conversion devices.

7. The fixed station for wind energy conversion of claim 6, further including:

electric power source means communicated to said electric motor means and incorporating means for interrupting electric power supply to said electric motor means so long as said wind energy conversion devices are rotating above a threshold speed.

8. The fixed station for wind energy conversion of claim 1, wherein:

said clutch means is a centrifugally-operated clutch.

9. The fixed station for wind energy conversion of claim 8, further including:

spring-operated disengagement means for centrifugally operated clutch.

10. The fixed station for wind energy conversion of claim 8, wherein:

said centrifugally-operated clutch includes an anemometer-controlled, electro-magnetically operated connector means for causing engagement of the clutch only for so long as said anemometer senses a reading that is below a predetermined threshold value.

11. The fixed station for wind energy conversion of claim 10, wherein:

the anemometer is arranged to sense wind speed.

12. The fixed station for wind energy conversion of claim 10, wherein:

the anemometer is arranged to sense rotation speed of at least one of said wind energy conversion devices.

* * * * *